(12) United States Patent
Miller et al.

(10) Patent No.: US 10,884,699 B2
(45) Date of Patent: Jan. 5, 2021

(54) FACILITATING CONTENT NAVIGATION BASED ON EVENT CONTEXT

(71) Applicant: MICROSOFT TECHNOLOGY LICENSING, LLC, Redmond, WA (US)

(72) Inventors: Adi L. Miller, Ramat Hasharon (IL); Haim Somech, Ramat Gan (IL); Michal Bloch Ron, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 16/153,410

(22) Filed: Oct. 5, 2018

(65) Prior Publication Data

US 2020/0110578 A1 Apr. 9, 2020

(51) Int. Cl.
*G06F 3/048* (2013.01)
*G06F 3/16* (2006.01)
*G06F 3/0482* (2013.01)

(52) U.S. Cl.
CPC ............ *G06F 3/167* (2013.01); *G06F 3/0482* (2013.01)

(58) Field of Classification Search
CPC ..... G06F 16/95; G06F 16/3344; G06F 16/438
See application file for complete search history.

(56) References Cited

U.S. PATENT DOCUMENTS

| | | | |
|---|---|---|---|
| 9,875,224 B1 * | 1/2018 | Vanblon | G06F 16/4393 |
| 10,474,669 B2 * | 11/2019 | Ono | G06F 3/167 |
| 2014/0282013 A1 * | 9/2014 | Amijee | G06F 3/0482 |
| | | | 715/732 |
| 2015/0132735 A1 * | 5/2015 | Edge | G06Q 10/10 |
| | | | 434/308 |
| 2015/0169590 A1 | 6/2015 | Gambhir et al. | |
| 2015/0178044 A1 | 6/2015 | Ehlen et al. | |
| 2016/0171119 A1 * | 6/2016 | Bufe | G06F 16/9577 |
| | | | 715/746 |
| 2016/0239489 A1 * | 8/2016 | Cunico | G06F 40/30 |
| 2018/0359530 A1 * | 12/2018 | Marlow | H04N 21/233 |

OTHER PUBLICATIONS

"International Search Report and Written Opinion Issued in PCT Application No. PCT/US19/052323", dated Nov. 14, 2019, 12 Pages.

* cited by examiner

*Primary Examiner* — Scott T Baderman
*Assistant Examiner* — Mario M Velez-Lopez
(74) *Attorney, Agent, or Firm* — Merchant & Gould P.C.

(57) ABSTRACT

Methods, computer systems, computer-storage media, and graphical user interfaces are provided for facilitating content navigation, according to embodiments of the present invention. In one embodiment, a data structure is generated to organize data from content corresponding with an event at which the content is discussed. During the event, input is monitored, and an input for which to identify relevant content is detected. Based on the input, content that is relevant to the detected input is identified using the data structure by comparing at least a portion of the detected input with the data in the data structure. An indication of the relevant content is provided to trigger presentation of the relevant content, or a notification thereof.

20 Claims, 6 Drawing Sheets

FACILITATING CONTENT NAVIGATION BASED ON EVENT CONTEXT

BACKGROUND

Content is oftentimes discussed during dialog among individuals. For example, during a presentation, a slide deck may be presented to facilitate explanation and discussion. During such discussions, a participant may have a question or make a comment. In many cases, a portion of the content being discussed can assist with addressing the question or comment. To identify and locate such relevant content, however, can be time consuming and disrupt the flow of the discussion.

SUMMARY

Various aspects of the technology described herein are generally directed to systems, methods, and computer storage media for, among other things, facilitating content navigation and presentation based on event context. In particular, content relevant to an input (e.g., a question or comment) detected during an event can be identified and, thereafter, such relevant content, or an indication thereof, can be navigated to or generated in an effort to advance the discussion. For example, the relevant content, or an indication thereof, may be visually or audibly presented for reference by one or more individuals participating in the discussion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
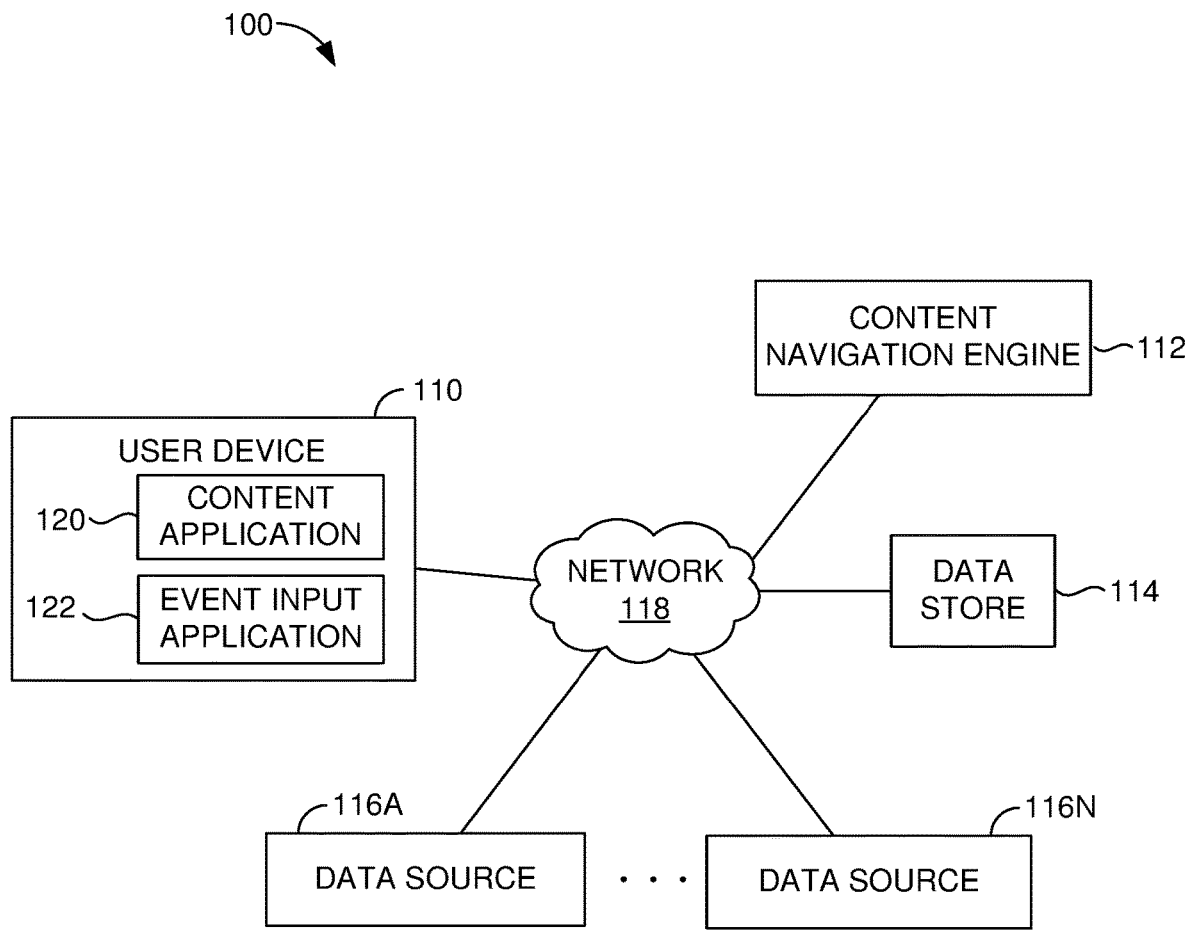
FIG. 1 is a block diagram of an exemplary system for facilitating content navigation, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Individuals often meet to discuss various topics within group environments. Oftentimes, during such discussions, content associated with a particular topic is shared with or presented to participants. By way of example, a presenter may present materials from a slide deck to an audience. As another example, two or more individuals may meet (e.g., in person, via a teleconference, via a video teleconference, or the like) to discuss a particular document or spreadsheet. During such discussions, a participant (e.g., an audience member) may have a question or comment related to the content being discussed.

Navigating to relevant content or presenting related material (e.g., an answer to a question), however, can be inefficient. By way of example only, assume a presenter is presenting materials related to a company's finances. Further assume that an audience participant asks a question related to revenue in a particular fiscal year. In such a case, the presenter must consider the question and a location within the slide deck that might have content relevant to revenue in the particular fiscal year. Thereafter, the presenter can navigate to the relevant material and continue with the discussion in an effort to address the question. Such manual content assessment and navigation, however, can be difficult, inefficient, and disrupt the flow of the presentation.

Moreover, in many cases, relevant content may not be identified and utilized to advance the discussion. For example, in many cases, the presenter may attempt to answer the question without navigating to any relevant content so as not to disrupt the flow of the presentation. In other cases, the presenter may not navigate to relevant content as the presenter may be unaware of any relevant content. In yet other cases, the presenter may navigate through the slides in an effort to find relevant content, but may fail to locate the desired content in a timely manner and, as such, may return to the current presentation slide.

Accordingly, embodiments of the present technology are directed to facilitating content navigation based on event context (e.g., event input). In particular, based on event context (e.g., a query input via an event participant), relevant content can be automatically identified and, thereafter, navigated to and/or presented. In this regard, during an event or discussion among multiple participants, relevant content can be recommended, navigated to, and/or presented to address a particular input or query proposed by one of the participants (e.g., audience participant). Further, a particular user reviewing content, such as a document or slide deck, can initiate navigation to particular relevant content by event input. Advantageously, relevant content is provided during the event without requiring a participant (e.g., presenter) to manually identify and locate material that might address another participant's input (e.g., a question). As such, embodiments described herein enhance both the effectiveness and efficiency of identifying and providing content related to a discussion at an appropriate time.

In operation, content related to or associated with an event can be analyzed. As described herein, an event generally refers to any type of event having participants in communication with one another or partaking (e.g., listening, presenting, discussing, or the like) in a discussion. As such, one example of an event may be a presentation having a presenter(s) and audience participants. Another example of an event may be a meeting or discussion among individuals. As can be appreciated, in accordance with various embodiments described herein, participants may partake in an event in-person, via a teleconference, via a video-teleconference, via a computer, a combination thereof, or the like. The content related to an event can be analyzed and indexed in advance of, or in accordance with, the event so that it can be utilized to address input that occurs during the event (e.g., a question or comment presented by a participant).

During the event, event input can be monitored and analyzed. When it is detected that content navigation may be useful or desired, content relevant to the event input can be identified and/or presented. By way of example only, assume a question is posed by a participant. In response to detecting the question, content within a document or slide deck being discussed that may be relevant to the question can be identified (e.g., using the indexed data) and presented via a display such that the relevant material to answer the question or continue the discussion is automatically presented. In some cases (e.g., low confidence in ascertaining question and/or identifying relevant material), a confirmation notification may be provided to a user to confirm the user would like to navigate to the identified relevant content. As another example, the relevant content within the document or slide deck may be analyzed and used to automatically present an answer to the question (e.g., via a display or an audio answer) or visually emphasize (e.g., highlight) a portion of content deemed most relevant. As discussed herein, the manner in which to provide relevant content (e.g., automatically navigating to relevant content, providing relevant content as an answer to a question, providing a location of relevant content, or the like) may be determined based on a state of the presentation, a confidence level of the event input, a confidence level of the relevant content, or the like.

Overview of Exemplary Environments for Facilitating Content Navigation Based on Event Context Referring initially to FIG. 1, a block diagram of an exemplary network environment 100 suitable for use in implementing embodiments of the invention is shown. Generally, the system 100 illustrates an environment suitable for facilitating content navigation (e.g., navigating to a particular page or slide within content, providing an answer to a question related to content, or the like), among other things, based on event context, such as participant input. The network environment 100 includes a user device 110, a content navigation engine 112, a data store 114, and data sources 116a-116n (referred to generally as data source(s) 116). The user device 110, the content navigation engine 112, the data store 114, and the data sources 116a-116n can communicate through a network 118, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, the user device 110 and data sources 116a-116n may be in communication with the content navigation engine 112 via a mobile network or the Internet, and the content navigation engine 112 may be in communication with data store 114 via a local area network. Further, although the environment 100 is illustrated with a network, one or more of the components may directly communicate with one another, for example, via HDMI (high-definition multimedia interface), DVI (digital visual interface), etc. Alternatively, one or more components may be integrated with one another, for example, at least a portion of the content navigation engine 112 and/or data store 114 may be integrated with the user device 110. For instance, a portion of the content navigation engine 112 configured to monitor event context may be performed via a user device, while identifying relevant content based on the event context may be performed via a server in communication with a user device.

The user device 110 can be any kind of computing device capable of facilitating content navigation based on event context. For example, in an embodiment, the user device 110 can be a computing device such as computing device 600, as described above with reference to FIG. 6. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as content application 120 and event input application 122 shown in FIG. 1. The application(s) may generally be any application capable of facilitating content navigation based on event context. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, content may be presented via a content application 120 operating on the user device 110. In this regard, the user device 110, via content application 120, might be used to present content. Content may refer to any type of electronic content, such as a document, an image, a slide deck, a file, online/web content, or the like. As such, a content application 120 may be used to present such various content. For example, Microsoft® PowerPoint® may be a content application 120 to present a slide deck, Microsoft® Word may be a content application 120 to present a document, Microsoft® Excel® may be a content application 120 to present a spreadsheet, Microsoft® Internet Explorer® may be a content application 120 to present web content. The content application 120 can include any type of application that facilitates content navigation. Further, the content application 120 can obtain content in any manner, such as via data source 116. In this way, data source 116 may communicate or provide content to the user device 110 (e.g., via network 118). As described, a content application may be a stand-alone application, a mobile application, a web application, or the like. In some cases, the functionality described herein may be integrated directly with an application or may be an add-on, or plug-in, to an application.

Content application 120 may allow a user to initiate automated content navigation and to perform, in response to initiating content navigation, automated navigation of content (e.g., a slide deck). In this regard, a user may select to implement automated content navigation (e.g., via a button, toggle, voice command, or the like). As can be appreciated, such a selection may occur prior to an occurrence of the event (e.g., at the beginning of a presentation) or during the event. Automated content navigation may be initiated at the user device 110 in any manner. For instance, upon initiating a presentation, a user may select an "automated content navigation" button via a user interface to initiate automated content navigation. As another example, automated content navigation may be initiated upon opening content (e.g., a particular slide deck) or an application that provides content (e.g., Microsoft® PowerPoint®). As can be appreciated, in embodiments, content application 120 may operate to automatically perform content navigation without a user input initiating such a desire (e.g., upon accessing or launching the content application 120, upon installing the content application 120, or the like).

Event input application 122 can generally receive or obtain event input to facilitate content navigation. As described, event input generally refers to any input provided in relation to an event, such as a meeting, presentation, or discussion. Input may be verbal communication, user interactions, user-device input or selections, or the like. For example, verbal communication may be captured as input based on an individual asking a question or making a comment during the event. As another example, user interactions may be captured as input based on an individual making a gesture (e.g., pointing to content). As yet another example, user-device input may be captured based on a text query input via a user device, for example, in communication with user device 110.

As can be appreciated, event input application 122 may be configured to capture one type of event input (e.g., voice) or various types of event inputs. In this regard, event input application 122 may be an application operating to obtain data via one or more sensors 130, such as microphones, cameras, etc. that may reside within the user device 110 or operate remote to the user device 110. One example of an event input application 122 may be a digital assistant, such as Cortana® operated by Microsoft Corporation. Although only one event input application 122 is illustrated, any number of event input applications may reside on the user device or external to the user device (e.g., a separate device within the event environment, a server, or the like).

User device 110 can be a client device on a client-side of operating environment 100, while content navigation engine 112 can be on a server-side of operating environment 100. Content navigation engine 112 may comprise server-side software designed to work in conjunction with client-side software on user device 110 so as to implement any combination of the features and functionalities discussed in the present disclosure. An example of such client-side software is content application 120 and/or event input application 122 on user device 110. This division of operating environment 100 is provided to illustrate one example of a suitable environment, and it is noted that there is no requirement that navigation engine 112 and user device 110 remain as separate entities.

In an embodiment, the user device 110 is separate and distinct from the content navigation engine 112, the data store 114, and the data sources 116 illustrated in FIG. 1. In another embodiment, the user device 110 is integrated with one or more illustrated components. For instance, the user device 110 may incorporate functionality described in relation to the content navigation engine 112, such as content manager 220 and/or event manager 230 of FIG. 2. For clarity of explanation, we will describe embodiments in which the user device 110, the content navigation engine 112, the data store 114, and the data sources 116 are separate, while understanding that this may not be the case in various configurations contemplated within the present invention.

The user device 110 communicates with the content navigation engine 112 to facilitate navigation of content based on event context. In embodiments, for example, a user utilizes the user device 110 to facilitate content navigation via the network 118. For instance, in some embodiments, the network 118 might be the Internet, and the user device 110 interacts with the content navigation engine 112 to navigate content. In other embodiments, for example, the network 118 might be an enterprise network associated with an organization. It should be apparent to those having skill in the relevant arts that any number of other implementation scenarios may be possible as well.

The content navigation engine 112 is generally configured to facilitate content navigation. In particular, in response to obtaining event input (e.g., via event input application 122), the event input can be used to identify content relevant to the event input. Thereafter, a manner in which to navigate content can be determined and relevant content can be presented accordingly. As described, content navigation generally refers to navigating content such that relevant content, or an indication thereof, is presented or otherwise provided, for example, to individuals participating in an event. Content navigation is oftentimes desired in real time as materials are relevant to an event. For example, in cases where an individual is presenting to an audience (in-person or virtually) using a set of slides, a question may be provided by a member of the audience. It may be difficult for the presenter to recall the location of the relevant material. Accordingly, an automatic navigation to the relevant content within the slide deck and/or automatic navigation to an answer to the question can be valuable for both the presenter and the audience. The content navigation engine 112, according to embodiments, can be implemented as server systems, program modules, virtual machines, components of a server or servers, networks, and the like.

The content navigation engine 112 generally identifies content relevant to input provided during an event (e.g., a question, comment, or discussion) and determines a manner in which to navigate the content. Generally, the content navigation engine 112 analyzes content associated with a particular event. Based on input obtained in connection with the event, a portion of the content related to the input can be identified. The content navigation engine 112 can then determine a manner in which to navigate the content (e.g., navigate to a content portion relevant to the event input, provide a notification of the content relevant to the event input, provide an answer to address the event input). In some cases, the manner in which to navigate the content may be based on a state of the event, a confidence level of the event input, a confidence level of the relevant content, or the like. Content identified as relevant to the event input, or an indication thereof, can be provided to the user device 110 for presentation.

Upon the content navigation engine 112 identifying a manner in which to navigate content, an indication of relevant content can be provided to the user device for presentation. For example, a content application, such as content application 120, presenting content can be automatically triggered to navigate to the relevant content. Additionally or alternatively, the content application may present a notification or recommendation to navigate to a particular portion of the slide deck or document that has material relevant to the input query. As another example, an event input application 122, such as a digital assistant (e.g., Cortana®), can respond with an answer in response to a question or a suggestion to navigate to a particular portion of the slide deck or document that has material relevant to the input query. Various types of implementations that facilitate content navigation are within the scope of embodiments described herein.

Figure 2:
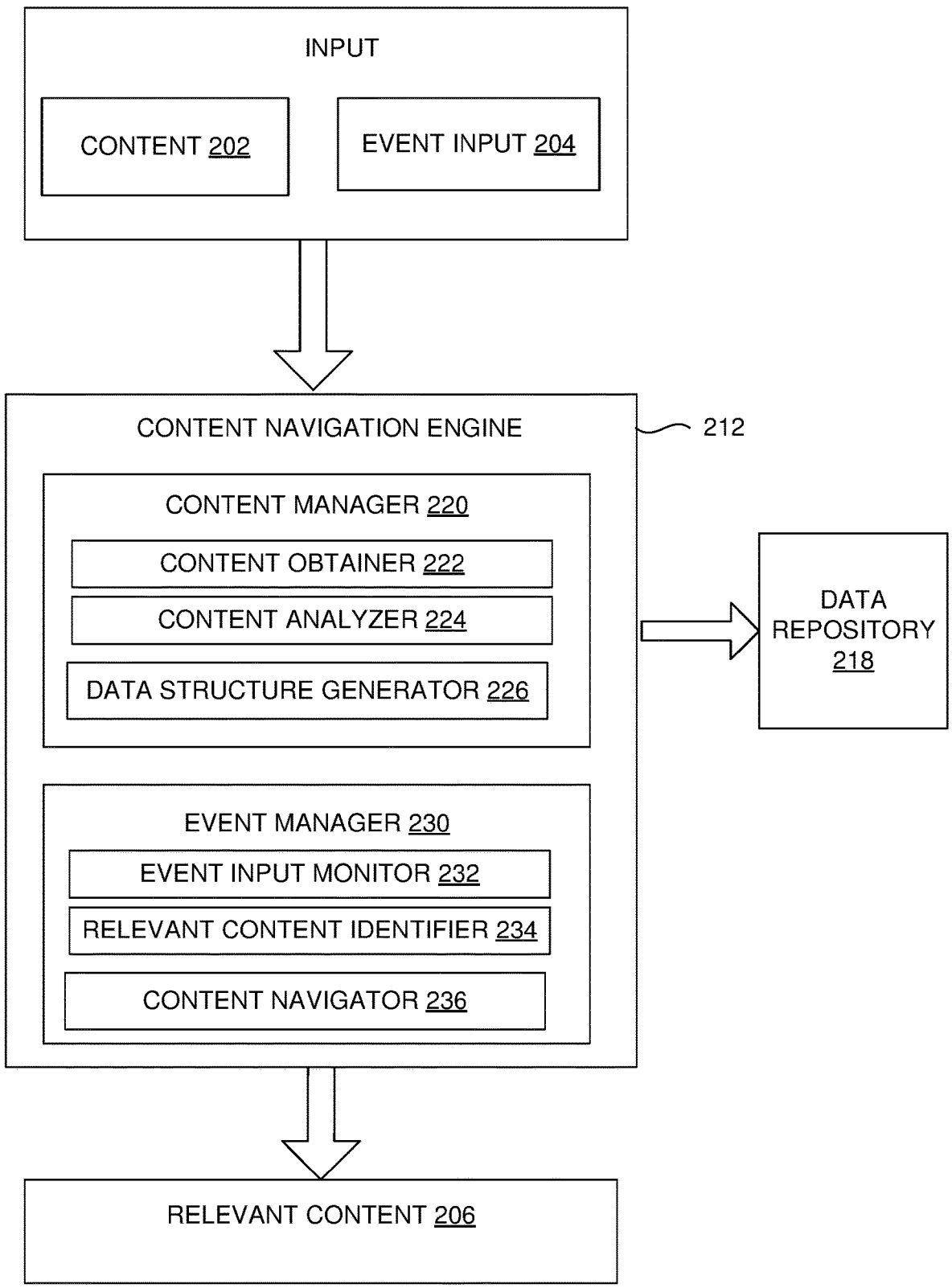
FIG. 2 is an example content navigation engine in accordance with aspects of the technology described herein.

Turning now to FIG. 2, FIG. 2 illustrates a content navigation engine 212. In embodiments, the content navigation engine 212 includes a content manager 220 and an event manager 230. According to embodiments of the invention, the content navigation engine 212 can include any number of other components not illustrated. In some embodiments, one or more of the illustrated components 220 and 230 can be integrated into a single component or can be divided into a number of different components. Components 220 and 230 can be implemented on any number of machines and can be integrated, as desired, with any number of other functionalities or services. By way of example only, content manager 220 may operate at a server, while event manager 230, or aspects thereof, may operate at a user device.

The content navigation engine 212 can communicate with the data repository 218. The data repository 218 is configured to store various types of information used by the content navigation engine 212. In embodiments, the content navigation engine 212 provides data to the data repository 218 for storage, which may be retrieved or referenced by the content navigation engine 212. Examples of types of information stored in data repository 218 may include, for example, content, content data, index tables, or the like.

The content manager 220 is generally configured to manage content. In this regard, the content manager 220 can manage content associated with events to facilitate automated content navigation. As shown in FIG. 2, the content manager 220 may include a content obtainer 222, a content analyzer 224, and a data structure generator 226. According to embodiments, the content manager 220 can include any number of other components not illustrated. In some embodiments, one or more of the illustrated components 222, 224, and 226 can be integrated into a single component or can be divided into a number of different components. Components 222, 224, and 226 can be implemented on any number of machines and can be integrated, as desired, with any number of other functionalities or services.

The content obtainer 220 can obtain (e.g., as input) content 202 associated with an event for which automated content navigation is or may be desired. As described, content may be in any number of formats. For example, content may be a slide deck, a document, an image, an audio recording, a spreadsheet, a web content, or the like.

As can be appreciated, content associated with an event can be obtained by content obtainer 222 in any number of ways. In some cases, content is received as input, for example, from a user device or other device being used (e.g., computing device in meeting room). For example, based on an upcoming event or a current event (e.g., presentation) as indicated in a calendar, a user device may provide content related to the event. By way of example only, upon recognizing an event occurring within a threshold amount of time (e.g., one day), the user device may communicate content associated with the event (e.g., included as an attachment of the calendar event) to the content navigation engine 212. As another example, content may be received based on selection by a user via a user device. For instance, a user accessing content may select an option within an application to trigger automated content navigation. Upon such a selection, the content may be communicated to the content navigation engine 212. As another example, upon launching or opening content, such content can be automatically communicated to the content navigation engine 212.

Although these examples generally describe the content being communicated from a user device, as can be appreciated, the content can be provided from a server or other device having access to the content. For example, based on a user accessing content at a user device via a remote server, the remote server may provide the content to the content navigation engine 212. In other cases, the content obtainer 222 may access content, for example, from a data store. In this regard, the content obtainer 222 may identify content to assess and access such content. Particular content to obtain or access in association with an event may be identified based on an occurrence of an upcoming event or an occurrence of a current event. In this way, upon detecting an approaching event (e.g., within a threshold amount of time from a calendar event within a calendar), content related to the event can be identified and accessed from data repository 218. Accordingly, the content obtainer 222 may associate content (e.g., slides, files, data) with an event. Generally, such content is related to a discussion or presentation to occur in relation to the event.

Upon obtaining content, content analyzer 224 can analyze the content to identify content data. Content data is generally used to refer to data or metadata associated with the content. Content data may be in the form of headings, titles, text, images, table data, graph data, or the like. In this regard, the content can be analyzed to identify or extract content data from the content that may be utilized in navigating content in relation to an event input (e.g., a participant inquiry or comment). The type of content data identified from the content may vary depending on implementations. For example, in some cases, the content analyzer 224 may analyze the content and identify content related to titles or headings, metadata tags, text, images, comments, graph data (e.g., axes labels), table data (e.g., a top row and/or most-left column), or the like. In other cases, certain types of content data may be identified, such as titles or headings and graph data.

Content data can be identified and/or extracted in any number of ways. For example, optical character recognition (OCR) may be applied to extract text. As another example, object recognition algorithms may be applied to analyze and recognize objects in images. As yet another example, the content may be analyzed to identify a topic or relation of data, such as a domain. Such a domain may be identified, for instance, for the content as a whole or for portions of the content. In this regard, additional input, such as vocabularies either general or domain specific, can be used to identify a domain.

Using the content data identified via the content analyzer 224, the data structure generator 226 can generate a data structure useable by the event manager 230. Generally, the data structure provides structure to data to enable the event manager 230 to identify content related or relevant to an event input. A data structure can be in any number of forms, such as a structured index. In accordance with various types of content data that may be identified, a data structure may include text, metadata, titles, headers, images, keywords, comments, etc. For example, a data structure may include text that is available in the content along with metadata that indicates whether the text was extracted from the title of the document, headers, comments, content, etc. As another example, a data structure may include table data, for instance, that is indexed using the title, column descriptor, row descriptor, or the like. As yet another example, a data structure may include graph data, for instance, that is indexed using titles, axes data, or the like. In some cases, the graph data may be translated or converted to tabular data and indexed accordingly.

The content data and/or data structures can be stored for subsequent use. In this regard, the identified content data and/or generated data structures can be stored in the data repository 218 for subsequent use to facilitate content navigation.

Turning to the event manager 230, the event manager 230 is generally configured to manage content navigation in association with event input 204. In particular, and at a high-level, the event manager can monitor event input and use such event input (e.g., a question) to facilitate content navigation. As shown in FIG. 2, the event manager 230 may include an event input monitor 232, a relevant content identifier 234, and a content navigator 236. According to embodiments, the event manager 230 can include any number of other components not illustrated. In some embodiments, one or more of the illustrated components 232, 234, and 236 can be integrated into a single component or can be divided into a number of different components. Components 232, 234, and 236 can be implemented on any number of machines and can be integrated, as desired, with any number of other functionalities or services.

The event input monitor 232 is generally configured to monitor event input. As described, event input refers to any type of participant input provided during the event. For example, event input may be verbal input, textual input, or the like. By way of example only, an event participant may ask a question, make a comment during the event, provide a gesture (e.g., point in three-dimensional space), submit a question via a computer, or the like. As such, the event input monitor 232 may be configured to monitor various types of input using various types of technology. As previously described, an event input application 122 (e.g., virtual assistant) may operate on a user device to capture or detect input and, upon obtaining input, provide such obtained input information to the event input monitor 232. Additionally or alternatively, servers, sensors, or other devices may provide input to the event input monitor 232. For example, participant computers in communication with the content navigation engine 212 may provide event input (e.g., questions typed in as input during the event) to the event input monitor 232.

In monitoring event input, the event input monitor 232 may identify or detect input for which to facilitate content navigation. To identify or detect input for which to facilitate content navigation, in embodiments, the event input monitor 232 can monitor the input to identify a relevant-content indicator. In this regard, an audio stream may be monitored and analyzed to identify a relevant-content indicator. Event input monitor 232 may employ various types of technology to monitor event input (e.g., audio streams), such as keyword spotting technology, speech recognition technology, language understanding technology, or the like.

A relevant-content indicator generally refers to any indicator or signal providing an indication that content relevant to the input may be desired. For example, in some cases, the event input monitor 232 may monitor for an explicit relevant-content indicator. An explicit relevant-content indicator may be an explicit question posed by a participant. In this regard, the event input monitor 232 may identify query intent associated with the explicit question. As another example, the event input monitor 232 may monitor for an implicit relevant-content indicator. An implicit relevant-content indicator may be language that implicitly indicates an interest in relevant content. In this regard, the event input monitor 232 may monitor for specific keywords related to the content (e.g., revenue, finance, or other keywords corresponding with the content) or other implicit indications (e.g., of query intent).

The relevant content identifier 234 can identify content relevant or related to the input. In this regard, in accordance with identifying or detecting input for which to facilitate content navigation (e.g., identifying a relevant-content indicator), the relevant content identifier 234 can utilize the input, or portion thereof, to identify content relevant to the input. As can be appreciated, identifying content relevant to the input can be performed in any number of ways. In some cases, the event input, or a portion thereof, along with the data structure generated by the data structure generator 226 can be used to identify content relevant to the input. As one example, keywords, properties, attributes, terms, or the like associated with the event input can be compared to data within the data structure to identify a similarity or match. For instance, assume a query includes the term "revenue." Further assume that an index is created including the term "revenue" or another similar term that points to portions of the content associated with "revenue" (e.g., slide 22 or page 7). In such a case, a match of the term "revenue" may be identified and used to identify a portion of content relevant to the event input.

Various algorithms may be employed to identify such relevant content, such as, for instance, matching heuristics. Other attributes may also be taken into consideration in identifying relevant content. For example, a current position within the content (e.g., slide 5) may be recognized and used to identify related content. As another example, a time at which a question is posed may be recognized and used to identify content being presented at or about the same time. For instance, assume a user electronically submits a question at a time when the presenter is discussing slide 5. In this case, the time at which the question was submitted may be used to identify content related to the question. As yet another example, a participant that provided the event input may be taken into account when identifying related content. As yet another example, additional input, such as vocabularies either general or domain specific, can be used to facilitate understanding the relation between the user request and the content.

As can be appreciated, relevant content can be located in multiple places in the content. For example, multiple portions of content or multiple items may be identified that match the input. As such, the relevant content identifier 234 may rank various portions of content to identify or select a most applicable occurrence of relevant content. The content may be ranked using various factors, including, for example, a location of the content, an extent of relevance, an amount of content, an identification of an entity that provided the content, or the like. As a specific example, an access factor may be used such that content most recently accessed by a user or a participant is prioritized or ranked higher than other content. As another specific example, content location factor may be used such that a location of content can impact priority. For instance, a file internal to a company may be prioritized or selected over a file external to the company. The factors analyzed or used may be used specified by a default setting or as a selected option (e.g., based on user preference). In additional or alternative embodiments, the relevant content identifier 234 may present multiple portions of relevant content to a user such that a user can select which content the user is interested in viewing.

As described herein, in some cases, the relevant content may be a specific answer to a query. In this regard, the relevant content identifier 234 may determine an answer to the query using the content associated with the event and/or external content. As can be appreciated, relevant content to answer a query may be generated by synthesizing, extracting, and/or filtering data. By way of example only, assume a question asked by a participant is "what is the revenue for fiscal year 2018?" In such a case, the generated data structure may be accessed to identify specific content within a presentation that discusses revenue. The specific content can then be analyzed to determine or extract the revenue for fiscal year 2018. As another example, assume a participant asks about projected sales forecasts for a future year. In such a case, the relevant content identifier 234 might extract data from a table and generate a graph projecting the sales forecasts for that year.

As described, in some cases, an external source (e.g., accessed via the Internet) may be accessed to facilitate determining or generating content that is relevant to a question. For instance, external content, such as online data or third-party data, may be accessed and utilized to answer a question. By way of example only, a topic analysis may be performed on the input (e.g., the question) and used as a query input for a search over other potential external content. In some embodiments, external content may be accessed and analyzed after determining the content being presented does not contain data relevant to the input (e.g., the question). As can be appreciated, external content may include other documents or files related to the event content (e.g., emails, documents, files, or records having the same project name or number, similar title, subject matter, project team members, or the like). Further, external content may also include Internet-based, online, or third-party data, or a combination of Internet data and files/documents/communications internal to the company. By way of example only, content may be synthesized that combines (a) a company's sales forecasts (e.g., using data derived from a document internal to the company having a project name in common with the presentation slides) with (b) internet-derived content published by the US government on mean income levels of households in specific regions.

Upon identifying content relevant to the event input, the content navigator 236 is generally configured to manage navigation such that the relevant content, or an indication thereof, is presented. In this regard, the content navigator 236 can initiate content navigation by providing the relevant content 206, or an indication thereof, for presentation to a user or participant(s). By way of example only, assume the relevant content identifier 234 identifies a portion of the content as relevant to an event input. In such a case, an indication of the relevant content portion (e.g., slide 7 or page 5) can be generated and communicated to a user device presenting the content. The user device, for example via a content application or an event input application, can then automatically navigate to the relevant content portion or provide an indication of the relevant content portion (e.g., utilize a digital assistant to indicate the relevant content portion).

In some implementations, a specific content navigation approach may be employed for each identification of relevant content. For example, in each instance where relevant content is identified, the content being presented may be automatically manipulated to navigate to the relevant content. As another example, in each instance where relevant content in the form of an answer is identified, the relevant content may be automatically presented. As yet another example, in each instance where relevant content is identified, a notification of the relevant content (e.g., page 5), or a location thereof, may be presented. In this regard, a notification of the relevant content, or an indication of the relevant content (e.g., location), may be presented for a user (e.g., presenter). The user (e.g., presenter) may then select to navigate to such relevant content, present the relevant content to other participants, utilize the content to further discussion, or the like. In some cases, only a particular participant (e.g., presenter) may be presented with relevant content, or a notification thereof, which the receiving participant can then utilize to formulate an answer or otherwise further discussion. This enables the receipting participant to address event input at an appropriate time.

In other implementations, the content navigation approach employed for identified relevant content may be based on various attributes, such as, for example, a state of the event, a confidence level of the event input, a confidence level of the related content, a source of identifying the related content, or the like. In such cases, the content navigator 236 can identify a manner in which to navigate relevant content associated with event input. In other words, the content navigator 236 may determine a manner in which a participant or set of participants should be presented with the related content. In some cases, a determination may be made to automatically navigate to the content or automatically present the content (e.g., an answer). In other cases, a determination may be made to present an option or recommendation to navigate to the related content. For example, a user may be provided with a notification that relevant content is identified. Such a notification can enable a user to select an option to navigate to the relevant content, present the relevant content only to the user (e.g., presenter), ignore the content, and/or the like.

As described, in some cases, determining a manner in which to navigate content may be based on a state of the event, a confidence level of the event input, a confidence level of the related content, a source of identifying the related content, or the like. A state of an event may refer to a state occurring at the time of the event input. For example, an event state may be a presentation state indicating that a presenter is currently discussing slides, an end of presentation state indicating that the discussion of the slides is completed (e.g., a question and answer session is ongoing), or the like. In this regard, one manner for navigating content may be determined when a presentation is ongoing, and another manner for navigating content may be determined when the presentation is completed and participants are asking questions. As another example, while a presentation is ongoing, content navigator 236 may determine not to present relevant content when the content has not yet been discussed (e.g., the relevant content corresponds with a slide not yet discussed).

A confidence level of the event input indicates a level of confidence of interpretation or analysis of the event input. For example, an event input confidence level may indicate an extent of confidence that a query intent is properly determined. In this regard, one manner for navigating content (e.g., automatically navigate to the relevant content) may be determined when the confidence level of the event input exceeds a threshold, and another manner for navigating content (e.g., provide an indication of the relevant content) may be determined when the confidence level falls below a threshold.

A confidence level of the relevant content indicates a level of confidence of identification of relevant content. For instance, a relevant content confidence level may indicate an extent of confidence that content is relevant to the event input. In this regard, one manner for navigating content (e.g., automatically navigate to the relevant content) may be determined when the confidence level of the relevant content exceeds a threshold, and another manner for navigating content (e.g., provide an indication of the relevant content) may be determined when the confidence level falls below a threshold.

A source of identifying the relevant content refers to a source from which the relevant content is obtained. For example, if relevant content is determined from a third-party, content navigation may occur in a manner different than if the relevant content is determined from the content being discussed.

As can be appreciated, the content navigator 236 may determine a manner in which to navigate content in any number of ways and using various algorithms. One specific example logic that may be used to determine a manner in which to navigate content follows:

| Event State | In Progress | Ended | In Progress | Ended |
|---|---|---|---|---|
| Input Type | Explicit | Explicit | Implicit | Implicit |
| Confidence > 0.8 | "The answer is . . . " | | Prompt the presenter with the answer | Skip to slide 4, highlight the answer |
| Confidence < 0.8 | "I think the answer is in slide 4. Should I jump to that slide?" | | Suggest to the presenter to skip to slide 4 | Suggest to everyone to skip to slide 4 |

In this example, when an event input is identified as explicit, an answer may be automatically presented when relevant content is identified with a confidence greater than 80%, irrespective of whether a presentation is in progress or in a question-and-answer phase. On the other hand, a recommendation to navigate to the relevant content may be presented when relevant content is identified with a confidence less than 80%. When an event input is identified as implicit, the event is ongoing, and relevant content is identified with confidence greater than 80%, the presenter is provided with the answer. When the event input is identified as implicit and the relevant content is identified with confidence less than 80%, but the event is in a question-and-answer phase, the relevant content is automatically presented. When the event input is identified as implicit and the relevant confidence is less than 80%, a suggestion to navigate to the relevant content may be provided, irrespective of whether the event is in progress or completed. As can be appreciated, any number of implementations or logic may be used to identify a manner in which to navigate relevant content.

Figure 3:
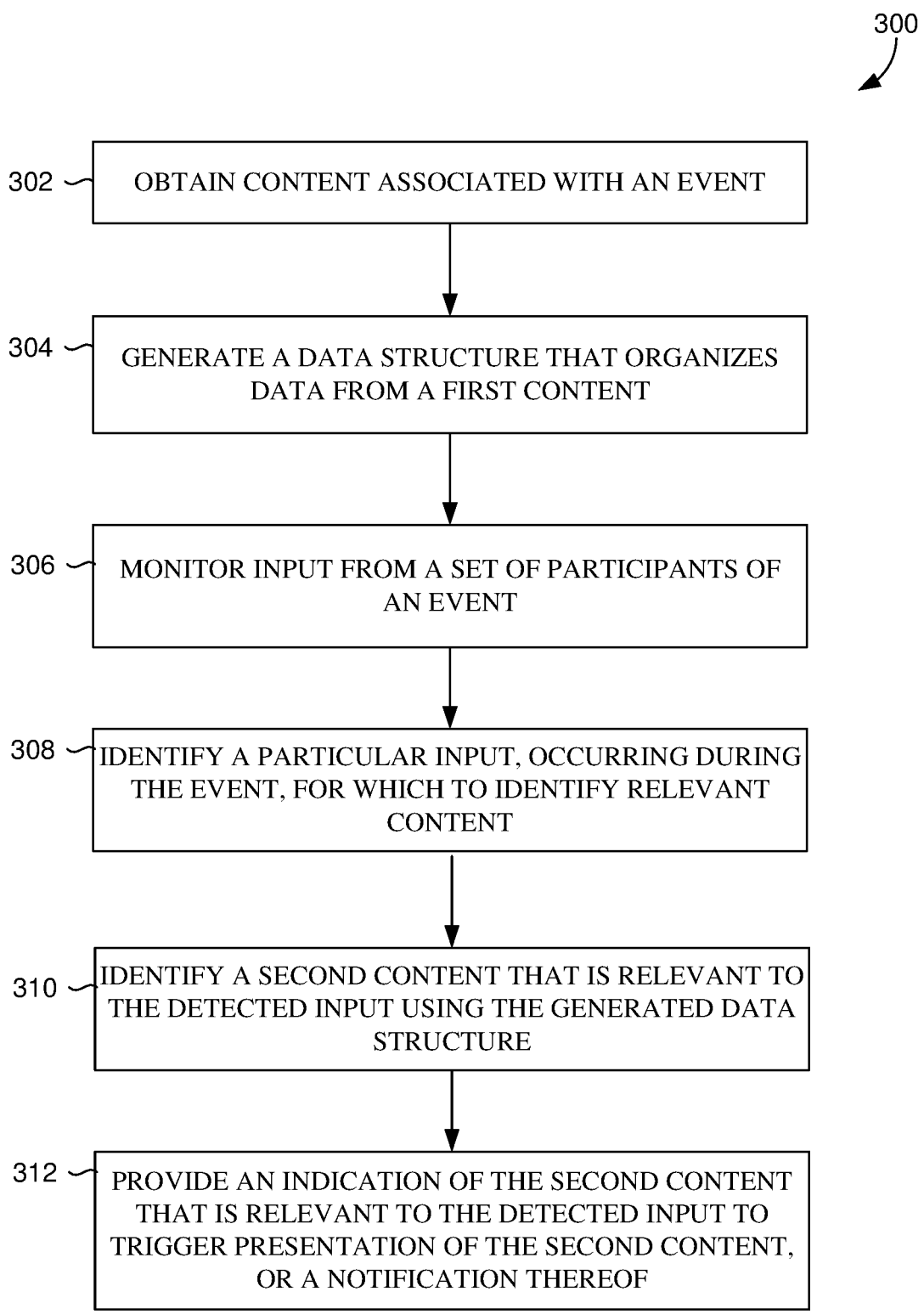
FIG. 3 provides an example method for facilitating content navigation based on event context, in accordance with aspects of the technology described herein.
Figure 4:
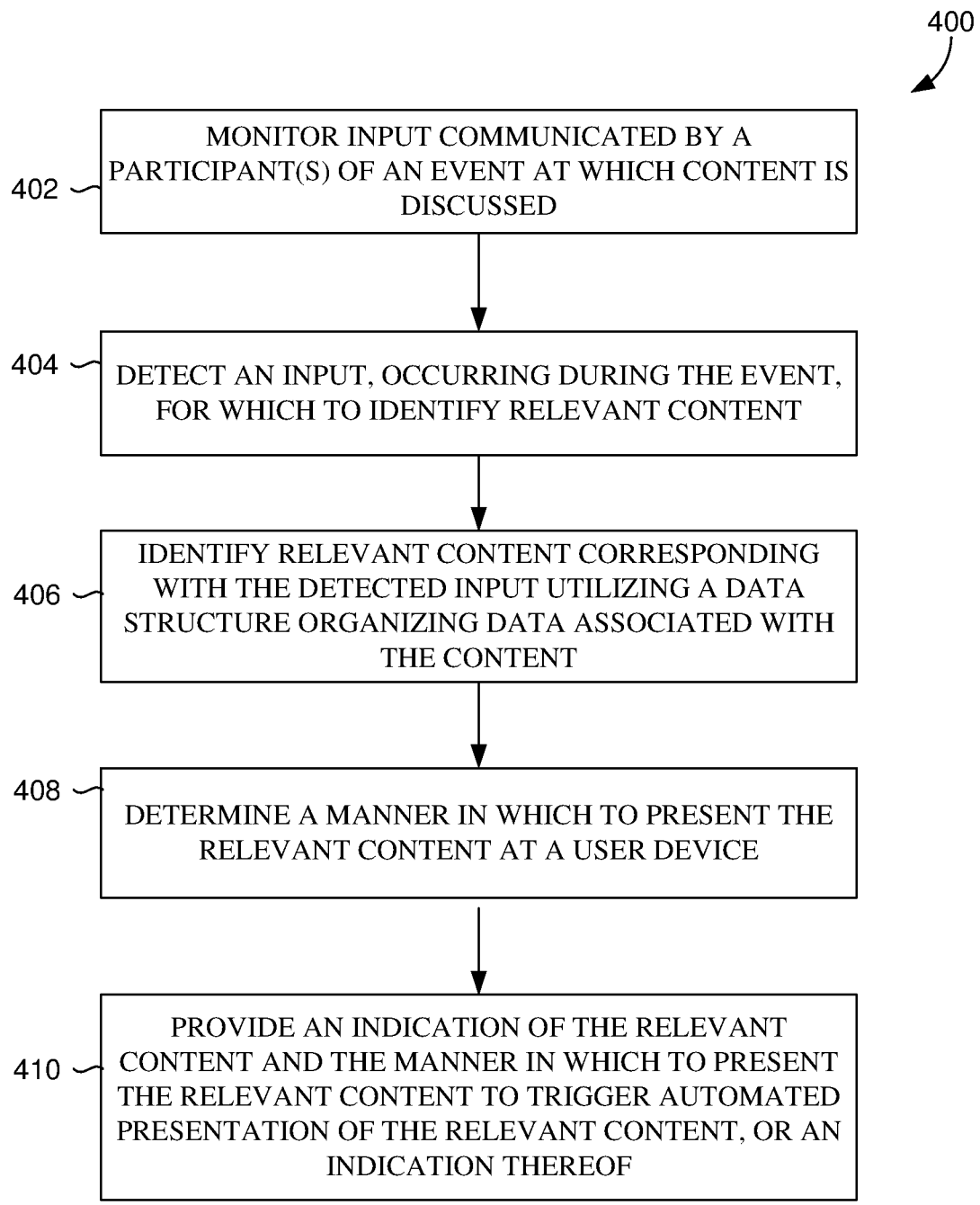
FIG. 4 provides another example method for facilitating content navigation based on event context, in accordance with aspects of the technology described herein.
Figure 5:
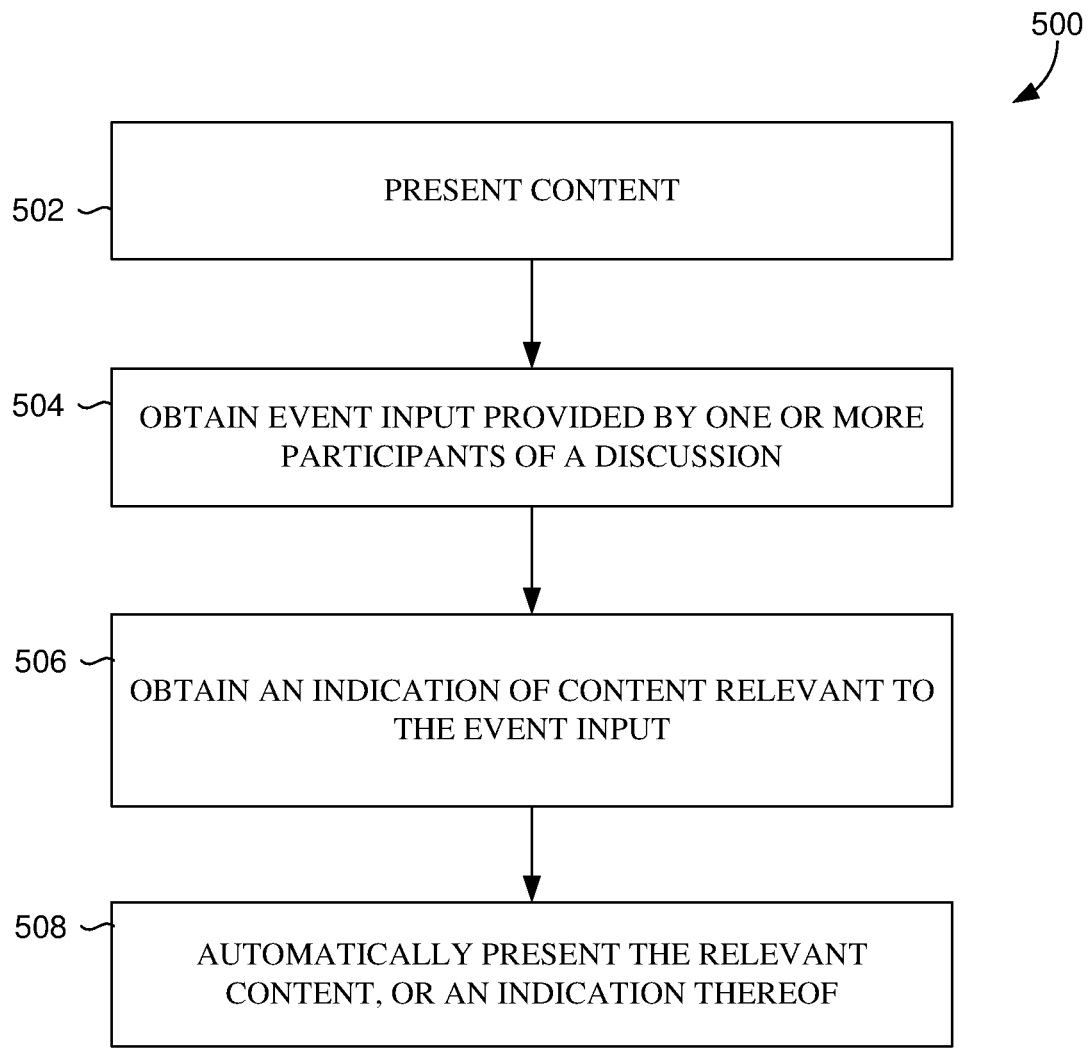
FIG. 5 provides another example method for facilitating content navigation based on event context, in accordance with aspects of the technology described herein.

Exemplary Implementations for Facilitating Content Navigation Based on Event Context As described, various implementations can be used in accordance with embodiments of the present invention. FIGS. 3-5 provide methods of facilitating content navigation based on event context, in accordance with embodiments described herein. The methods 300, 400, and 500 can be performed by a computer device, such as device 600 described below. The flow diagrams represented in FIGS. 3-5 are intended to be exemplary in nature and not limiting.

Turning initially to method 300 of FIG. 3, method 300 is directed to facilitating content navigation based on event context, in accordance with embodiments of the present invention. Initially, at block 302, content associated with an event is obtained. An event may be, for example, a presentation, meeting, or discussion during which the content may be discussed. Thereafter, at block 304, a data structure that organizes data from a first content is generated. The data may be any type of data associated with the content, such as titles, subtitles, metadata, comments, graphs, charts, text, images, or the like. At block 306, input from a set of participants of an event, such as a presentation or discussion, is monitored. For example, input may be verbal input provided by participants of an event. In accordance with monitoring input, at block 308, a particular input, occurring during the event, for which to identify relevant content is identified. The particular input may be an explicit query intent or an implicit query intent. For example, a participant (e.g., presenter) may specifically ask to navigate to content related to projected revenues. As another example, a participant may mention "projected revenues" in the discussion.

Thereafter, at block 310, a second content that is relevant to the detected input is identified using the generated data structure. The second content can be identified in any number of ways. In some embodiments, the second content can be identified by comparing at least a portion of the detected input with the data in the data structure. In some cases, the second content may be a portion of the first content. In other cases, the second content may be content derived or generated using the first content. At block 312, an indication of the second content that is relevant to the detected input is provided (e.g., to a user device) to trigger presentation of the second content, or a notification thereof, that is relevant to the detected input. For example, an indication of the second content may be a position or location within the first content containing the relevant second content. As another example, an indication of the second content may be such content.

With reference to method 400 of FIG. 4, FIG. 4 is directed to facilitating content navigation based on event context, in accordance with embodiments of the present invention. Initially, at block 402, input communicated by a participant (s) of an event at which content is discussed is monitored. The input may be communicated verbally or electronically. At block 404, an input, occurring during the event, for which to identify relevant content is detected. The input may be detected based on explicit or implicit query intent. At block 406, relevant content corresponding with the detected input is identified utilizing a data structure organizing data associated with the content. In embodiments, the relevant content is identified by comparing at least a portion of the detected input with the data in the data structure. The relevant content may be a portion of the content, content derived from a portion of the content, content derived from external data, or the like. At block 408, a manner in which to present the relevant content at a user device is determined. Such a determination can be made based on a state of the event, a confidence level of the input, a confidence level of the relevant content, a type of input, and/or the like. Thereafter, at block 410, an indication of the relevant content and the manner in which to present the relevant content is provided to trigger automated presentation of the relevant content, or an indication thereof (e.g., at a user device). For example, a user device may be triggered to automatically navigate to the relevant content, automatically present the relevant content (e.g., an answer), automatically present notification of a location or position of the relevant content, and/or the like.

Turning now to method 500 of FIG. 5, FIG. 5 is directed to facilitating content navigation based on event context, in accordance with embodiments of the present invention. In embodiments, method 500 may be performed in association with a user device. Initially, at block 502, content is presented. At block 504, event input provided by one or more participants of a discussion is obtained. For example, event input may be verbal input provided by a presenter or audience participant during a presentation. At block 506, an indication of content relevant to the event input may be obtained. In some cases, a manner in which to present the relevant content may also be obtained. At block 508, the relevant content, or an indication thereof, is automatically presented. In this regard, the content being presented may be navigated to present a portion of the content relevant to the event input, an answer relevant to the event input may be presented, a notification of the relevant content may be presented, or the like.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 6:
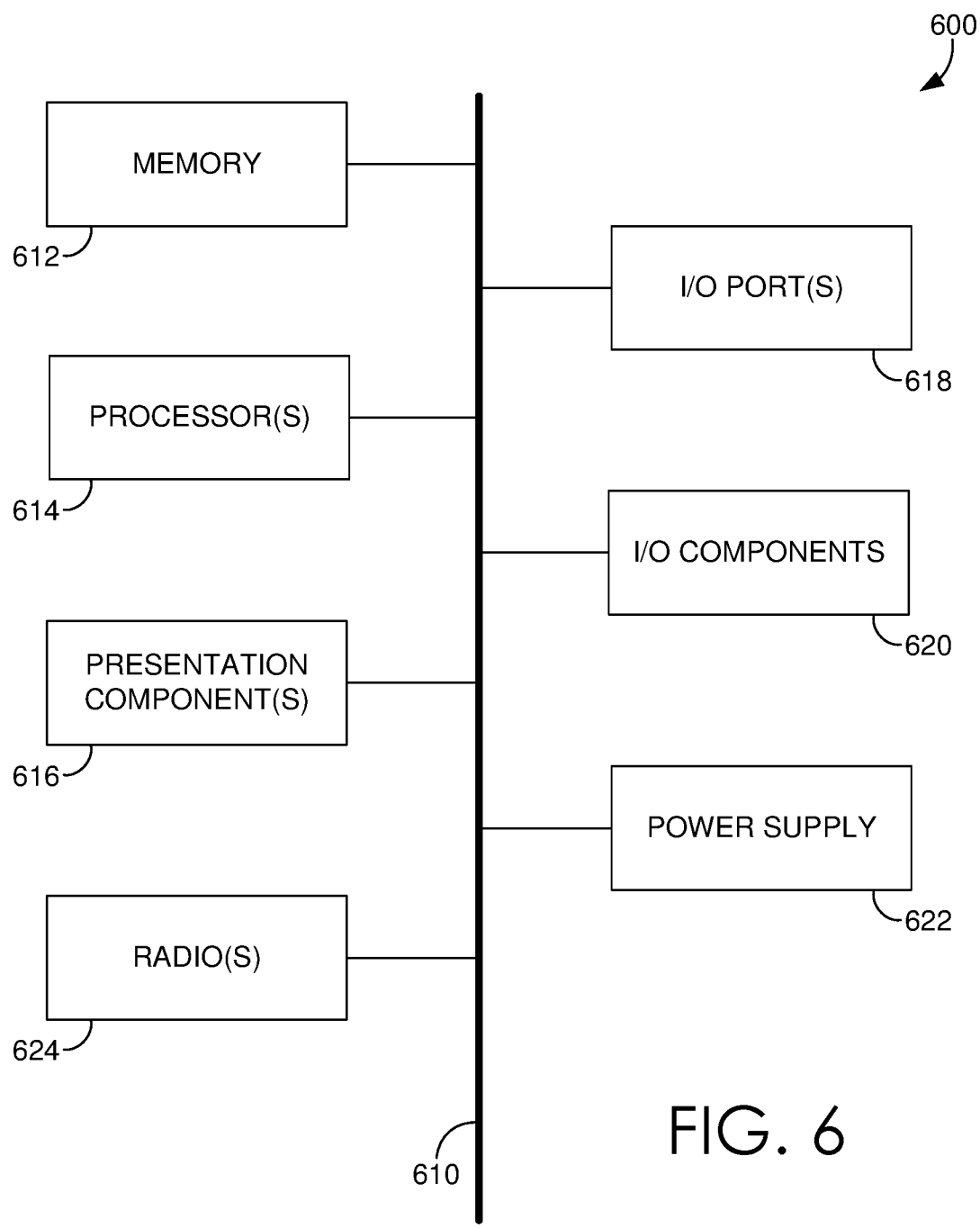
FIG. 6 is a block diagram of an exemplary computing environment suitable for use in implementing aspects of the technology described herein.

Referring to the drawings in general, and initially to FIG. 6 in particular, an exemplary operating environment for implementing aspects of the technology described herein is shown and designated generally as computing device 600. Computing device 600 is just one example of a suitable computing environment and is not intended to suggest any limitation as to the scope of use or functionality of the technology described herein. Neither should the computing device 600 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, an illustrative power supply 622, and a radio(s) 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O port(s) 618 allow computing device 600 to be logically coupled to other devices including I/O components 620, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include radio(s) 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system, comprising:
  a processor; and
  computer storage memory having computer-executable instructions stored thereon which, when executed by the processor, perform operations, comprising:
    generating a data structure that organizes data associated with a first content corresponding with an event;
    monitoring input communicated by a participant of the event at which the first content is provided on a computing device associated with a presenter;
    identify a second content that is relevant to the monitored input by comparing at least a portion of the monitored input with the data in the data structure;
    determining a content navigation approach for presenting the second content, the content navigation approach comprising a presentation option that is based, at least in part, on a state of the event, a confidence level associated with the monitored input, and a type of the monitored input; and
    providing an indication of the second content and the content navigation approach to the computing device associated with the presenter.

2. The computing system of claim 1, wherein the first content is included in a multimedia presentation.

3. The computing system of claim 1, wherein monitoring input comprises monitoring verbal input or textual input.

4. The computing system of claim 1, wherein monitoring input comprises identifying explicit query intent in association with the monitored input.

5. The computing system of claim 1, wherein monitoring input comprises identifying implicit query intent in association with the monitored input.

6. The computing system of claim 1, wherein the data associated with the first content comprises text, images, titles, headers, metadata, comments, keyword, or a combination thereof.

7. The computing system of claim 1, wherein the second content comprises a portion of the first content.

8. The computing system of claim 1, wherein the second content comprises content derived from the first content.

9. The computing system of claim 1, wherein the indication comprises a position within the first content containing the relevant second content.

10. A computer-implemented method, comprising:
  monitoring input communicated by a participant of an event at which content is provided on a computing device associated with a presenter;
  identifying relevant content corresponding to the monitored input utilizing a data structure organizing data associated with the content, wherein the relevant content is identified by comparing at least a portion of the monitored input with the data in the data structure;
  determining a content navigation approach for presenting the relevant content, the content navigation approach comprising a presentation option that is based, at least in part, on a state of the event, a confidence level associated with the monitored input, and a type of the monitored input; and
  providing an indication of the relevant content and the content navigation approach to the computing device associated with the presenter.

11. The method of claim 10, wherein the data comprises text, images, titles, headers, metadata, comments, keyword, or a combination thereof.

12. The method of claim 10, wherein the content navigation approach comprises navigating to present the relevant content from a currently presented content.

13. The method of claim 10, wherein the relevant content comprises a portion of the content.

14. The method of claim 10, wherein the relevant content is generated from a portion of the content.

15. The method of claim 10, further comprising receiving a selection of the presentation option.

16. A system, comprising:
  a processor; and
  a memory storing computer executable instructions that, when executed by the processor, perform operations, comprising:
    monitoring input communicated by a participant of an event at which content is presented;
    identifying relevant content corresponding to the monitored input communicated by the participant utilizing a data structure organizing data associated with the content, wherein the relevant content is identified by comparing at least a portion of the monitored input with the data in the data structure;

determining a content navigation approach for presenting the relevant content, the content navigation approach comprising a presentation option that is based, at least in part, on a state of the event, a confidence level associated with the monitored input, a confidence level associated with the relevant content, and a type of the monitored input; and providing an indication of the relevant content and the content navigation approach to a computing device associated with a presenter of the content.

17. The system of claim 16, wherein the presentation option comprises automatic navigation to the relevant content, automatic presentation of the relevant content, or automatic presentation of a location of the relevant content.

18. The system of claim 16, wherein the presentation option comprises a viewable presentation or an audio presentation.

19. The system of claim 16, wherein the relevant content comprises a portion of the content or a first content derived from at least a portion of the content.

20. The system of claim 16, further comprising instructions for receiving a selection of the presentation option.

* * * * *